J. R. PENDELL.
Wash-Boilers.
No. 138,576. Patented May 6, 1873.
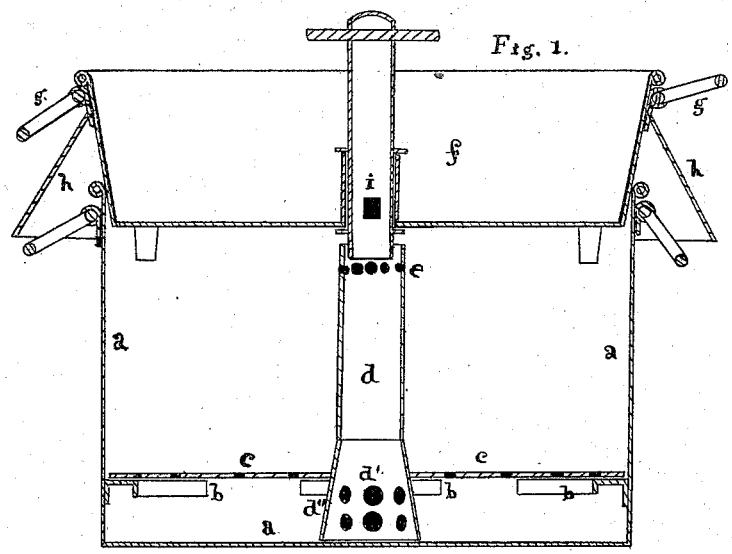
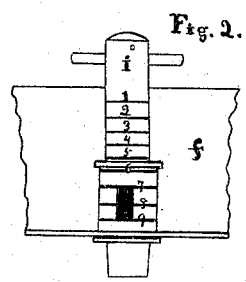
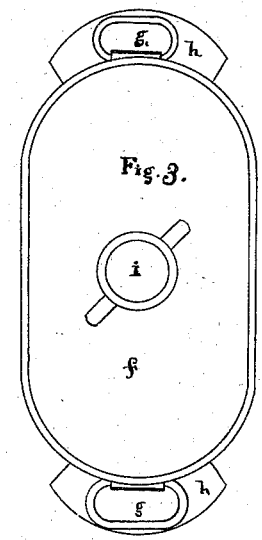
Samuel J. Parker
A. M. Lucas
Witnesses.
John R. Pendell.
Inventor.

UNITED STATES PATENT OFFICE.

JOHN R. PENDELL, OF DRYDEN, NEW YORK.

IMPROVEMENT IN WASH-BOILERS.

Specification forming part of Letters Patent No. 138,576, dated May 6, 1873; application filed March 6, 1873.

*To all whom it may concern:*

Be it known that I, JOHN R. PENDELL, of Dryden, Tompkins county, New York, have invented an Improved Clothes Wash-Boiler, of which the following is a specification:

The object of my invention is to make a simple and durable boiler, of that class where the action of the steam and hot water is largely relied on for the purpose of washing the clothes; and my invention relates to the construction and arrangement of the means by which it is done, as will be apparent as I describe it.

Figure 1 is a perpendicular section of my boiler, showing its construction. Fig. 2 is a detached view of my graduated valve and tube for letting the water of the upper pan down into the tube of the lower pan; and Fig. 3 is a ground plan of my upper pan, with the steam-guards for the protection of the hands of the operator.

In Fig. 1, $a$ and $a$ are the sides and the bottom of my boiler; with, $b\ b$, projections on a ledge near the bottom, on which the perforated pan $c$ rests. In the center of this pan the tube $d$ is inserted, and reaches to near the top of the boiler, where at $e$ it has numerous holes. The upper pan $f$ has beveled sides, which fits into and closes tightly the mouth of the boiler, and has handles, $g$, on two sides of it, just beneath which are the guards $h$, for the purpose of defending the hands of the user of the boiler, when the upper pan is removed in opening the boiler. In the middle of this upper pan, at $i$, is a faucet, which opens directly into the top of the tube $d$ of the lower pan, and this faucet is graduated, so that it indicates the quantity or water let down out of the upper pan through the tube into the boiler. A faucet in the boiler near its bottom opens and lets the water be drawn off at pleasure. The tube of the lower pan extends below that pan, and has beveled sides, and large holes in it for the admission of steam and hot water into the tube $d$, and at the same time this extension of this tube downward to the bottom of the boiler, gives a middle support to this pan.

The mode of using the mechanism I have described is as follows: I fill the water-chamber below the lower pan even with the bottom of this pan, putting into the water soap, sal-soda, or other erasive or cleaning ingredients, as I consider necessary, and I place the boiler on the stove, adjusting the lower pan to its place. Then I soap the clothes in their most soiled places, and pack them into the steamer on this pan. Then the upper pan is put in place and nearly filled with cold water. As soon as the steam is generated it ascends the tube $d$ with the boiling water, and thus a current of steam and boiling water is established up the tube. The water falls on the clothes and finds its way through and among the clothes, down to the water-chamber beneath the pan, through the holes in this pan, and around its edges. The steam that would tend to escape, is condensed by the coldness caused by the cold water of the upper pan. When the water in the upper pan has become heated, I draw off by the faucet at the bottom of the boiler the dirty water, or a portion of it, and by the graduated faucet of the upper pan let down out of the upper pan water to supply the place of that drawn off. I repeat this change of water once, twice, or three times, if necessary, to clean the clothes, adding cold water to the upper pan from time to time.

The advantages and uses of my invention are apparent to those skilled in the art to which it appertains.

Claims.

I claim—

1. The combined arrangement and construction of the steamer $a$, lower pan $c$, tube $d$, upper pan $f$ with beveled sides, the graduated faucet or tubular aperture $i$, and guards $h$, substantially as and for the purpose set forth.

2. The upper pan $f$, combined and arranged as described, with guards $h$ and double tubular faucet $i$, graduated as described, all as set forth.

JOHN R. PENDELL.

Witnesses:
  S. J. PARKER,
  A. M. LUCAS.